United States Patent [19]
Bietry

[11] Patent Number: 4,600,276
[45] Date of Patent: Jul. 15, 1986

[54] OPTICAL DISC PLAYER LENS
[75] Inventor: Joseph R. Bietry, Rochester, N.Y.
[73] Assignee: Eastman Kodak Company, Rochester, N.Y.
[21] Appl. No.: 646,993
[22] Filed: Sep. 4, 1984
[51] Int. Cl.[4] .............................................. G02B 13/18
[52] U.S. Cl. .................................................. 350/432
[58] Field of Search ......................................... 350/432

[56] References Cited
U.S. PATENT DOCUMENTS
4,415,238 11/1983 Braat et al. ........................... 350/432
4,469,413 9/1984 Shirayanagi ......................... 350/432

Primary Examiner—John K. Corbin
Assistant Examiner—Rebecca D. Gass
Attorney, Agent, or Firm—John B. Turner

[57] ABSTRACT

A lens for use in optical disc players comprising a single positive meniscus element having the following parameters:

| SURFACE | RADIUS | THICKNESS |
|---------|-----------|-----------|
| 1 | Aspheric | 2.269 mm |
| 2 | 47.7003 mm | |

The aspheric surface 1 is defined in accordance with the following relationship:

$$X = \frac{Cy^2}{1 + \sqrt{1 - C^2y^2}} + Dy^4 + Ey^6 + Fy^8$$

wherein coefficient
$C = 0.2794401$
$D = -0.1359364 \times 10^{-2}$
$E = -0.6606383 \times 10^{-4}$
$F = -0.1056564 \times 10^{-4}$ and wherein X is the sag of the aspheric surface from a plane reference surface at a radial distance y from the axis of the lens. The refractive index, $N_{800}$, of the element is 1.82198 and the Abbé V number is 23.8.

1 Claim, 2 Drawing Figures

OPTICAL DISC PLAYER LENS

BACKGROUND OF THE INVENTION

1. Field of the Invention

This invention relates to lenses for use in optical disc players.

2. Description of the Prior Art

Optical discs are known which consist of a rigid transparent disc with a reflective coating on the surface remote from the read head of the player. Non-reflective dots are created in the reflective coating to create a record of information. The record is read by directing a laser beam at the reflective coating, through the transparent disc, and sensing the reflected energy, whereby the dots may be detected by virtue of their low reflectivity.

The laser beam is focussed on the plane of the reflective surface by a lens and reflected energy is focussed on a sensor by the same lens. The laser beam must be very accurately focussed on the reflective surface, within the transparent disc, and the player must maintain this exact focus as the disc rotates at high speed in front of the lens. The disc may not be quite planar, there may be some slop in the rotational mount of the disc, and ambient conditions may change. All these factors lead to a necessity for adjusting the focus which is effected by moving the lens. Usually, the focus adjustment has to be very rapid. Rapid movement of the lens is easier the less the mass of the lens.

It is an object of the present invention to provide a lens for an optical disc player, which lens has good resolution and low mass.

SUMMARY OF THE INVENTION

According to the present invention there is provided a single element lens for an optical disc player. The first face of the lens, to be away from the disc, is convex and aspheric with the aspheric equation:

$$X = \frac{Cy^2}{1 + \sqrt{1 - C^2y^2}} + Dy^4 + Ey^6 + Fy^8$$

wherein coefficient $C = 0.2794401$
$D = -0.1359364 \times 10^{-2}$
$E = -0.6606383 \times 10^{-4}$
$F = -0.1056564 \times 10^{-4}$ and X is the sag of the aspheric surface from a plane reference surface at a radial distance y from the axis of the lens. The other surface of the lens has a radius of 47.7003 mm and the thickness of the lens is 2.269 mm. The index of refraction, $N_{800}$, of the glass of the lens is 1.82198, and its Abbé V number is 23.8.

BRIEF DESCRIPTION OF THE DRAWINGS

The features of the invention may best be appreciated by reference to the following detailed description taken in conjunction with the drawings in which.

DETAILED DESCRIPTION OF THE PREFERRED EMBODIMENT

Figure 1:
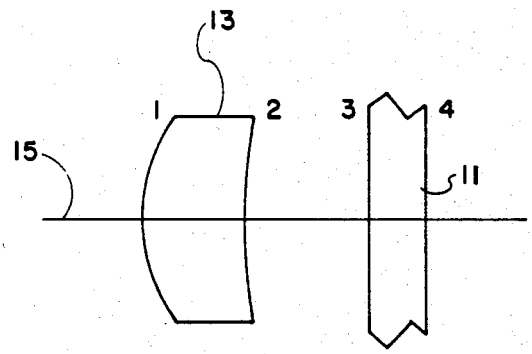
FIG. 1 is a schematic representation of a lens in accordance with the present invention and a portion of an optical disc, in operative relation to one another.
Figure 2:
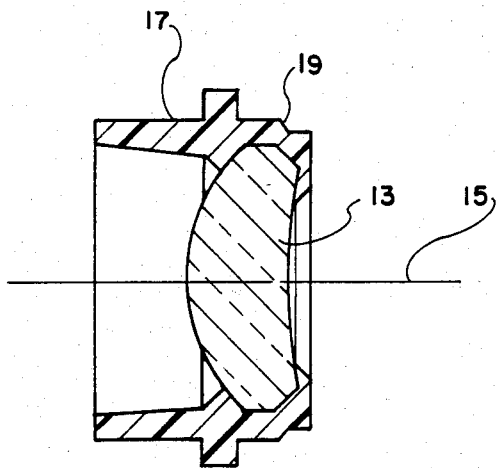
FIG. 2 illustrates the lens of FIG. 1 with its plastics tire.

As shown schematically in the drawings, a lens for a player of an optical disc 11, comprises a single element 13. The lens element 13 is a positive meniscus element with surface 1 being convex and aspheric and surface 2 being concave and spheric.

The parameters for the element 13 are:

| SURFACE | RADIUS | THICKNESS | $N_{800}$ |
| --- | --- | --- | --- |
| 1 | Aspheric | 2.269 | 1.82198 |
| 2 | 47.7003 | | |

The aspheric surface, 1, may be described by the following equation:

$$X = \frac{Cy^2}{1 + \sqrt{1 - C^2y^2}} + Dy^4 + Ey^6 + Fy^8$$

This equation describes the surface in terms of its surface sag X at a semi-aperture distance y from the axis of the lens. The coefficient C is the surface curvature at the vextex of the lens, and is equal to the reciprocal of the radius of curvature at the vertex.

The values of the coefficients C, D, E and F in the equation for the aspheric surface 1 in the present lens element are:

$C = 0.2794401$
$D = -0.1359364 \times 10^{-2}$
$E = -0.6606383 \times 10^{-4}$
$F = -0.1056564 \times 10^{-4}$ The Petzval sum of the element is 0.005364 and it has a 1.00° semi-angular field.

The refractive index of the element, $N_{800}$, is 1.82198. The Abbé V number is 23.8.

The optical disc 11 is 1.2 mm thick and has a reflective coating on surface 4 for bearing information. The information is in the form of dots created by a laser destroying the reflectivity of the coating.

The optimum spacing of the lens element from the surface 3 of the disc is 2.478 mm, measured at the axis 15 of the lens. With this spacing the surface 4 is at the focus of the element.

In the present embodiment the glass element 13 is mounted in a tire-like ring 17 of plastics material. The ring 17 has a circular cylindrical surface 19 which is coaxial with the axis 15 of the element 13. The ring is molded on the element and the molding procedure is such that the axis of the lens is positioned coaxial with the cylindrical surface of the mold cavity which defines the surface 19. In this way a cylindrical surface coaxial with, and fixed relative to, the axis of the lens element, is achieved in an economical way without imposing constraints on the process of actually forming the lens element.

As is known, the video disc player includes, as an energy source for reading a disc, a laser which operates in the infra-red region of the spectrum. The lens described above is optimised for this portion of the spectrum.

I claim:

1. A lens for an optical disc player, the lens comprising a single positive meniscus element having an aspheric convex surface to be disposed away from the disc and having the following parameters:

| SURFACE | RADIUS | THICKNESS |
|---------|--------|-----------|
| 1 | Aspheric | 2.269 mm |
| 2 | 47.7003 mm | | the refractive index, $N_{800}$, of the element is 1.82198 and the Abbé V number is 23.8, with the aspheric surface 1 being defined in accordance with the following relationship:

$$X = \frac{Cy^2}{1 + \sqrt{1 - C^2 y^2}} + Dy^4 + Ey^6 + Fy^8$$

with the coefficients having the values:
 C=0.2794401
 D=−0.1359364×10$^{-2}$
 E=−0.6606383×10$^{-4}$
 F=−0.1056564×10$^{-4}$
and wherein X is the sag of the aspheric surface from a plane reference surface at a radial distance y from the axis of the lens.

* * * * *